United States Patent [19]

Caridis et al.

[11] 4,372,200
[45] Feb. 8, 1983

[54] DIRECT FIRED FRYER WITH WIPER MEANS

[75] Inventors: Andrew A. Caridis, Foster City; Clark K. Benson, Millbrae; Anthony A. Caridis, Belmont, all of Calif.

[73] Assignee: Heat and Control, Inc., San Francisco, Calif.

[21] Appl. No.: 260,101

[22] Filed: May 4, 1981

[51] Int. Cl.³ ............................................. A47J 37/12
[52] U.S. Cl. ........................................ 99/404; 99/407; 99/408; 210/167; 210/DIG. 8
[58] Field of Search ................ 99/404, 405, 406, 407, 99/408, 403; 126/391; 210/DIG. 8, 167, 187, 182, 415; 15/3.13

[56] References Cited

U.S. PATENT DOCUMENTS

| | | | |
|---|---|---|---|
| 2,182,735 | 12/1939 | O'Dowd | 99/408 X |
| 2,546,163 | 3/1951 | McBeth | 99/404 |
| 2,833,203 | 5/1958 | Benson et al. | 99/404 |
| 3,203,341 | 8/1965 | Hedgepeth | 99/404 X |
| 3,209,678 | 10/1965 | Benson et al. | 99/406 |
| 3,309,981 | 3/1967 | Benson et al. | 99/405 |
| 3,376,806 | 4/1968 | Magnusson | 99/404 X |
| 3,472,155 | 10/1969 | Caridis et al. | 99/404 |
| 3,757,672 | 9/1973 | Szabrak | 99/404 |
| 4,026,804 | 5/1977 | Keating | 99/408 X |
| 4,251,895 | 2/1981 | Caridis et al. | 15/3.13 |

FOREIGN PATENT DOCUMENTS

2444746 10/1975 Fed. Rep. of Germany ........ 99/408

*Primary Examiner*—Billy J. Wilhite
*Attorney, Agent, or Firm*—Flehr, Hohbach, Test, Albritton & Herbert

[57] ABSTRACT

A direct fired fryer includes a combustion chamber heated by burner means and heats a vat of cooking oil through a partition wall as well as through a network of heat conducting tubes arranged in the vat and communicating with the combustion chamber. A wiper conveyor sweeps fines from the bottom of the vat to a sump for discharge outside of the conveyor and also cleans the upper surfaces of the heat conducting tubes to minimize the carbonaceous burnoff.

9 Claims, 9 Drawing Figures

DIRECT FIRED FRYER WITH WIPER MEANS

This invention relates to a food cooker and more particularly concerns a food cooker of the direct fired fryer type which is adaptable for cooking a large variety of food products including breaded and battered products, fish sticks, meat patties, breaded veal cutlets and pet food.

Prior developments in cooker design are disclosed in the issued United States patents held by the assignee of the present application, including U.S. Pat. No. 3,472,155 granted Oct. 14, 1969, No. 3,309,981 granted Mar. 21, 1967, No. 3,209,678 granted Oct. 5, 1965 and No. 2,833,203 granted May 6, 1958. With the exception of the food cooker disclosed in the last mentioned patent, such developments in cookers using cooking oil included a heating means separated from the cooker such as a heat exchanger where the cooking oil was circulated by a pump between the cooking vat and heat exchanger. It is apparent that there is a substantial capital investment in a cooking system which includes a heat exchanger, pumps and filter means all of which permit substantial control to be maintained over the cooking oil quality as well as affording good thermal efficiencies in operation. The last criteria is especially significant when comparing the thermal efficiencies realized in prior direct fired fryers with those having a remotely located heat exchanger but here it should be appreciated that the better efficiencies in cookers equipped with heat exchangers is due in some measure to economies of scale being that these units are generally larger in capacity than the direct fired fryer. Nevertheless, it is recognized that direct fired fryers tend to use a disproportionate amount of fuel when fired from below or when fired through cross tubes or longitudinal tubes disposed in the oil contained by the cooking vat. Inferior combustion efficiencies and poor fuel utilization were common where firing was into the tubes because the restricted space available in the tubes did not permit complete combustion of the fuel and resulted in a compromise between a very long yellow flame or a very bright but noisy blue flame projecting into the firing tube.

Contributing to the generally higher operational costs of prior direct fired fryers when viewed on an output basis is the tendency of the heated surfaces to acquire a coating of carbonaceous materials deposited by the product through the oil called "burn on." The burn on material reduces heat conductivity through the metal whether it be on the bottom pan surface or on the cross tubes for tube-fired fryers. A serious cleaning problem is also caused by burn on within the fryer which must be taken into account in the overall cost of fryer operation. Furthermore, the presence of burn on within a fryer degrades the product by causing black specks which are picked up by the product and can be unsightly. Further carbon particles in the oil ultimately result in an increased free fatty acid presence within the cooking oil which causes the oil to have a rancid taste. It has been recognized that an increase in free fatty acids within the cooking oil results in product degradation. An important consideration in this invention was to avoid these shortcomings.

In summary, the invention resides in an improved direct fired fryer including a frame having a combustion chamber thereon equipped with burner means for heating the atmosphere within the combustion chamber. A cooking vat having walls exposed to the combustion chamber is equipped with a plurality of heat conducting tubes arranged therein in first and second groups with the first group of tubes connecting with a manifold communicating with the combustion chamber and also connecting with a second manifold. A second group of heat conducting tubes connects the second manifold to a third manifold which communicates with an exhaust stack. The heated atmosphere from the combustion chamber circulates through the heating tubes disposed below the nominal oil level in the cooking vat and wiper means arranged in the cooking vat sweep fines towards a sump at one end of the vat and also wipes the top surfaces of the heat conducting tubes.

An object of the invention is to provide an improved direct fired fryer which is economical both to fabricate and to operate by achieving efficiencies in fuel utilization and by maintaining a clean condition over extended periods of operation.

Another object of the invention is to provide a cooking unit of the type described including means for continually brushing, sweeping or wiping the surfaces which act as heat transmitting elements to the cooking oil and thus reduce burn on.

Another object of the invention is to provide a fryer incorporating an improved oil filtering system having movable means for continually sweeping solid particles from a stationary filter means.

Another object of the invention is to provide a direct fired fryer which includes heat transfer surfaces along the side walls of the fryer as well as along the bottom and which includes heat transfer surfaces immersed in the cooking oil contained by the fryer vat.

These and other objects will be better understood from the following description of a preferred form of the invention as illustrated in the accompanying drawings.

Figure 1:
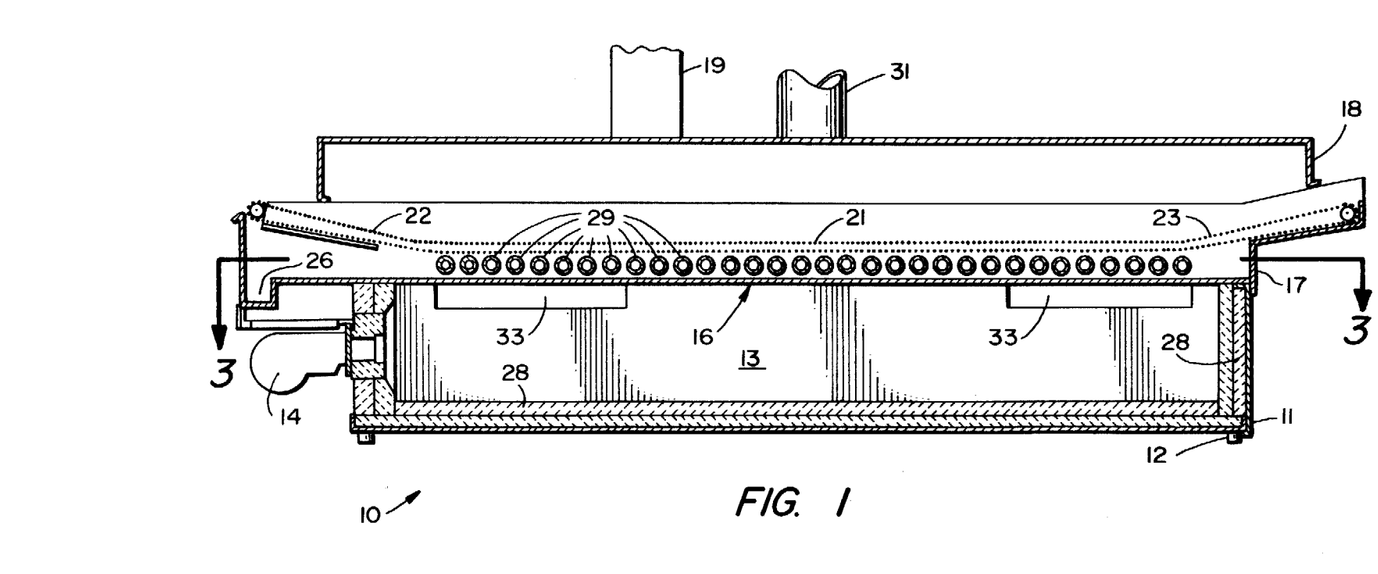
FIG. 1 is a longitudinal sectional view of the improved fryer of the present invention.
Figure 2:
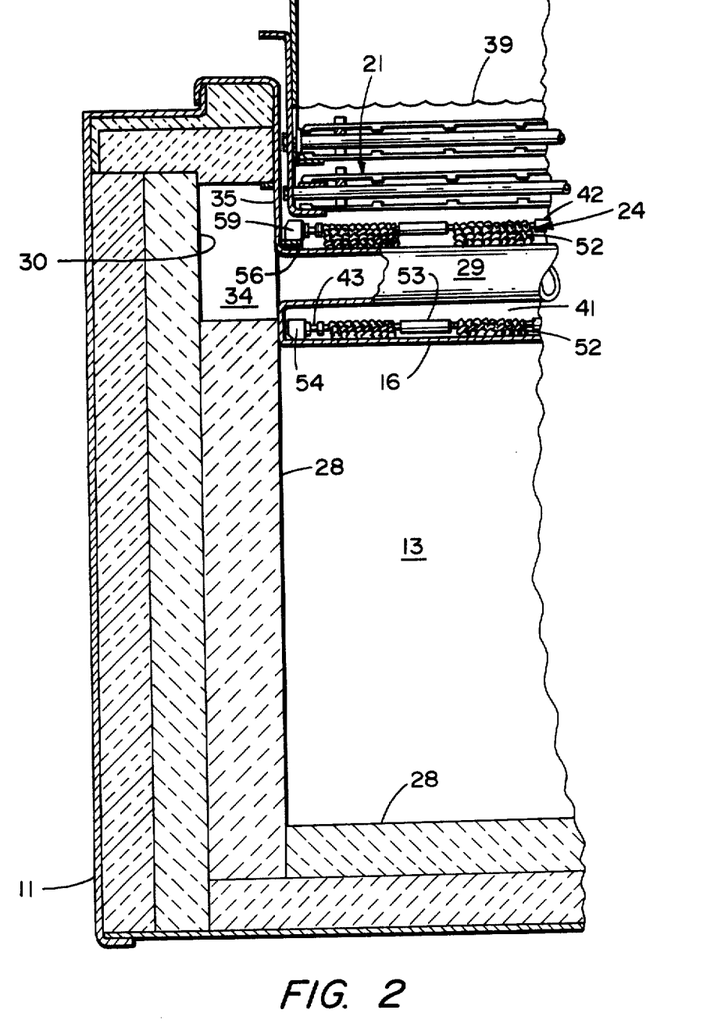
FIG. 2 is an enlarged fragmentary, transverse sectional view taken in the direction of the arrows 2—2 of FIG. 3.
Figure 3:
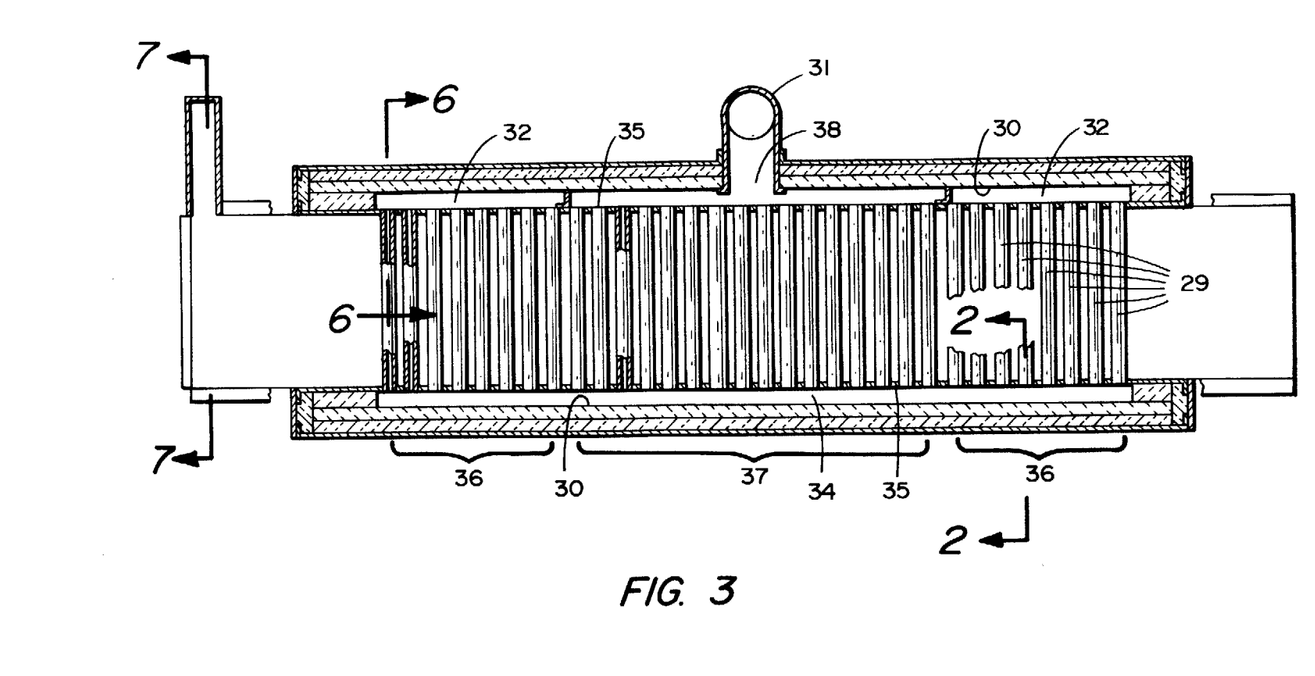
FIG. 3 is a view in the direction of the arrows 3—3 of FIG. 1.

The cooking system or fryer 10 of the present invention is shown in FIGS. 1, 2 and 3 of the drawings and includes a frame 11 formed of sheet metal and structural members, including the legs 12, and serves to embrace a combustion chamber 13 equipped with a burner 14. In the upper portions of the combustion chamber 13 is disposed the bottom wall 16 of a cooking vat or container 17 which holds a supply of cooking oil (not shown). Portions of the combustion chamber extend along the side walls of the vat 17 as will appear below. The vat 17 is enclosed on the top by a hood 18 which is equipped with an exhaust stack 19 which contains the cooking oil vapors within the cooker 10 to minimize discharge of the cooking vapors into the surrounding work area.

Figure 4:
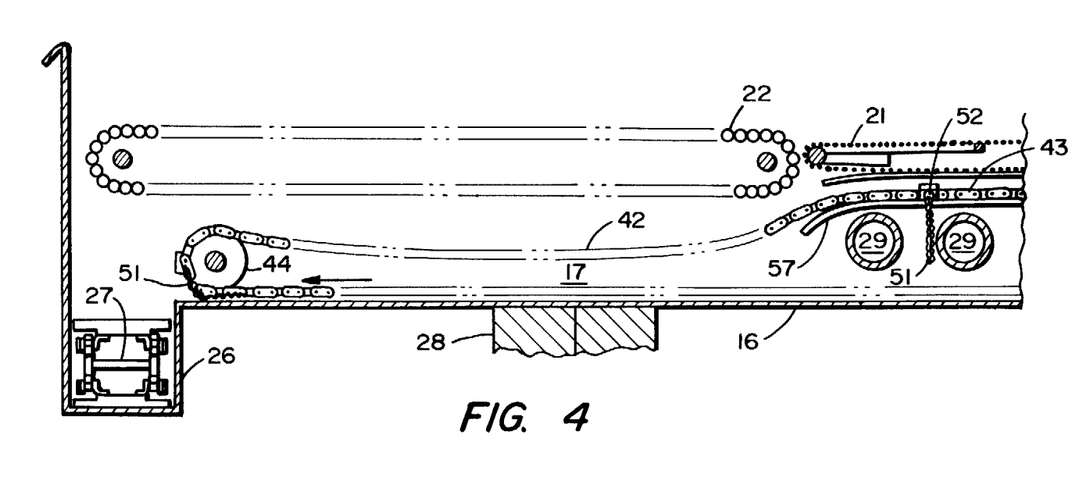
FIG. 4 is a fragmentary view in the plane of FIG. 1 but showing on an enlarged scale the feed end of the fryer with the infeed conveyor in a lowered condition.
Figure 5:
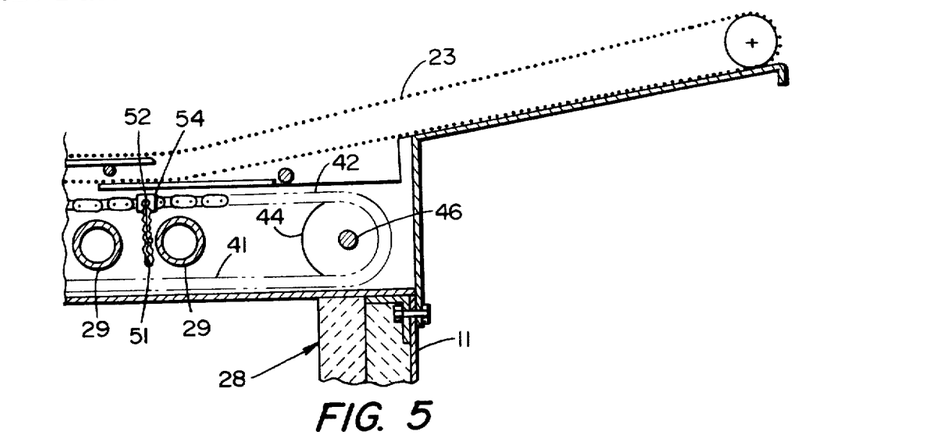
FIG. 5 is a view like FIG. 4 but showing the discharge end of the fryer.

A product conveyor 21, referring to FIGS. 2 and 4, is arranged in the cooking vat 16 to receive product from an in-feed conveyor 22, which may occupy upon choice a declining attitude as shown in FIG. 1, or a horizontal attitude as shown in FIG. 4. The product conveyors carry the product through the cooking vat to the discharge section 23 of the conveyor where the product is elevated from the cooking oil to discharge from the cooker 10 into a subsequent finishing operation including seasoning, packaging and the like.

Figure 7:
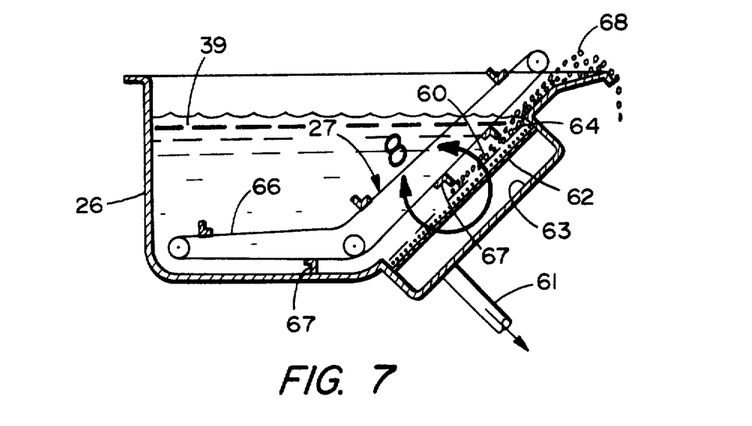
FIG. 7 is a view of a reduced scale taken in the direction of the arrows 7—7 from FIG. 3.

Arranged below the product conveyor 21 in the vat 16 is a wiper conveyor system 24 which serves to sweep fines towards a sump 26 arranged at the feed end of the cooker 10, a continuously movable filter system 27 may be disposed in the sump 26, as indicated in FIGS. 4 and 7, for removing fines from the unit while filtering the cooking oil. The wiping conveyor system 24, sump 26 and filter system 27 will be described more fully below.

Figure 6:
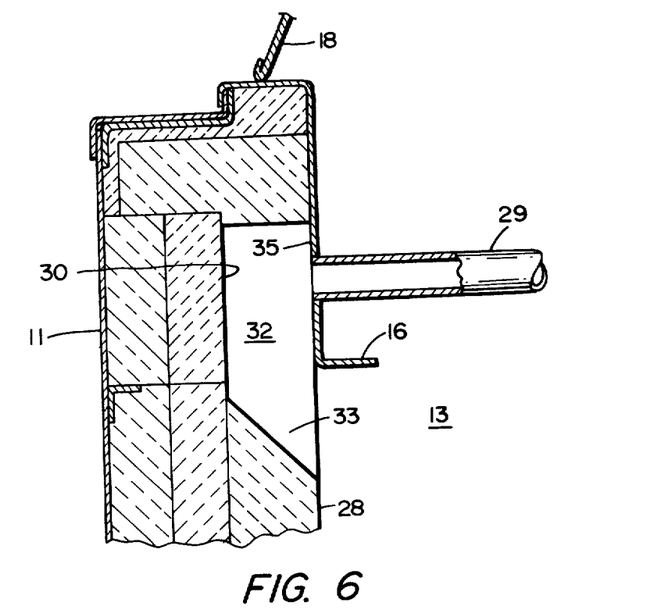
FIG. 6 is a view in the direction of the arrows 6—6 from FIG. 3.

The combustion chamber 13 extends substantially the full length of the cooking vat 16 as shown in FIG. 1 but is somewhat wider than the vat 17 as shown in FIG. 3 so as to provide heating compartments or manifold portions 32, 34 and 38 along the side walls 35 of the vat and the sides 30 of the combustion chamber as may be seen from FIGS. 2, 3 and 6. The combustion chamber is preferably provided with walls arranged with insulating materials such as insulating blocks or insulating fire brick or the like 28 mounted in the casing 11 and this arrangement substantially reduces heat flow out to the surroundings from the combustion chamber 13 where the burner 14 may create temperatures on the order of 1500° to 1900° F. A substantial amount of heat is transmitted to the cooking oil through the bottom wall or pan 16 of the vat 17 as well as through the side wall portions 35 of the vat which define one boundary of the manifolds 32, 34 and 38 described below. A further considerable amount of heat is imparted to the cooking oil within the vat 17 by a plurality of heat conducting tubes 29 arranged in sets to communicate with a plurality of manifolds so that the hot atmosphere from the combustion chamber 13 may circulate through the manifold and tubes in a path to be described in detail below before exiting the cooker 10 at a stack 31, FIG. 3.

More particularly, the system for using the heated atmosphere from the combustion chamber 13 for heating the cooking oil through use of the heating tubes 29 includes the provision of a first manifold 32, as shown in FIGS. 3 and 6, which is formed by the space between the side walls 35 of the vat 17 and the surface 30 of the fire brick and which communicates with the combustion chamber 13 through an elongated slot 33 formed between the vat and a recess in the insulation blocks 28 as shown in FIGS. 1 and 6. The manifold 32 is arranged at each end of the fryer 10 as may be seen from FIG. 3. A second manifold 34, similarly constructed, is arranged on the opposite side of the fryer and extends substantially the full length of the pan but is not in communication with the combustion chamber 13 as are the first manifolds 32 but receives heated atmosphere therein transferred to it through the heat conducting tubes as described below.

As shown in FIG. 3, a first set 36 of eight heat conducting pipes or tubes 29 extends between the first 32 and second 34 manifolds at each end of the vat. Depending upon the size and heat requirements of the unit a larger or smaller number than eight tubes in the first set may be employed. A second set 37 of, for example, sixteen conducting tubes 29 extends from the second manifold 34 to a third manifold 38 in communication with the stack 31. It is apparent from the above that the hot atmosphere generated in the combustion chamber 13 heats the oil through the pan 16 and is caused to circulate into the first manifold 32 through the slots 33 from the combustion chamber 13. The hot atmosphere then passes from the first manifold 32 through the first set 36 of conducting tubes into the second manifold 34 and then into the second set 37 of conducting pipes to the third manifold 38 before exiting to the stack 31 of the heating system.

As may be seen from FIG. 2, the conducting tubes 29 are arranged above the bottom wall 16 of the vat 17 and below the nominal liquid level 39 of the oil. The substantial external area of the tubes 29 afford rapid heat transfer to the cooking oil and through the inclusion of selected internal heat absorbing partitions or heat recouperators (not shown) within the tubes 29 the heat transfer may be further increased so that a substantial amount of heat is taken from the atmosphere generated in the combustion chamber and delivered to the cooking oil. For example, the unit 10 maintains the cooking oil at a temperature on the order of 300° to 375° F. with a stack temperature on the order of 900° F. and a combustion chamber temperature on the order of 1700° F. The volume of oil in the vat is on the order of 150 gallons. In a fryer unit where the cooking surface area was on the order of 30 square feet the heat transfer area, arranged in the configuration described above, was 86 square feet giving a ratio of heat transfer area to cooking area of 2.8 which is substantially more heat transfer area than achieved in previous direct fired cooking units.

The fines wiper conveyor 24, FIG. 2, is adapted to sweep the bottom wall 16 of the vat 17 with its lower run 41 and to wipe the upper periphery of each conducting tube 29 on the upper run 42. The wiper conveyor 24 is of endless conveyor construction having a plurality of interconnected chain links 43 reeved over sprockets 44, FIG. 4, one pair of which are driven through a drive shaft 46 coupled to a motor through a speed reducer (not shown) so that the conveyor 24 moves at a very slow rate of speed, say, 12 inches per minute, for progressively cleaning the vat. The wiper elements 51 are formed of lengths of wire screen mesh material and suspended from cross rods 52 which extend between chain links 43 arranged on opposite sides of the wiper conveyor. The wiper elements 51 extend somewhat less than the full width of the pan and preferably are short elements maintained in spaced position by spacer members 53 arranged on successive cross rods 52 in staggered relationship so that one cross rod 52 may have a plurality of wiper and spacer elements arranged therealong offset from the cross rods and spacers 53 on the next adjacent rod 52, as shown in FIG. 2. The end of each cross rod 52 is equipped with a non-metalic sliding block 54 arranged on the outside of the chain link 43 so that the wiper may slide along the bottom pan 16 on the lower run 41 and along the horizontal track 56 on the upper wiper run 42. A guide rail 57, FIG. 4, is provided to guide the run 42 onto the track 56 so that the wiper elements 51 may take the position shown in FIG. 4 for wiping action over the upper 180° circumferential surface of the cross tubes 29.

Referring now to FIGS. 4 and 7, food particles 60 and the like may drop from the product conveyor 21 and fall through the cooking oil. These are swept in a positive manner along the pan 16 by the continuously movable wiping conveyor 24 and are deposited in the sump 26. An outlet 61 from the sump is coupled to an oil circulating, positive displacement pump (not shown) so that oil may be continuously withdrawn from the sump 26 through a fines removal system 27 at the rate of about 20 gallons per minute. The oil thus removed and filtered to eliminate particles down to about the 10 micron or less range, is returned to the vat 17 at an inlet (not shown) near the product discharge. More particularly, the fines removal filter system useful with the invention includes a stationary filter element 62 arranged over a plenum 63 which extends upwardly to about the nominal oil level 39, FIG. 7. If desired, a layer of diatomaceous earth 64 may be retained upon the stationary filter element 62 or other filter media may be employed such as fine wire screen 65, filter paper 69 or the like, or a combination of these elements, FIG. 8.

The filter system 27 includes a continuously wiping conveyor 66 having flights 67 adjustable with respect to the distance above the filter surface. This gives a wiping action across the surface of the stationary filter 62 with the conveyor 66 delivering the particles 60 thus removed to a discharge chute 68 below which may be positioned a refuse container (not shown). Thus, fines carried along the path 16 into the sump 26 are maintained entrained in the oil withdrawn from the sump through the discharge outlet 61 and thus the fines are drawn against the stationary filter 62 equipped with suitable filter media. The flighted, continuous conveyor 66 sweeps over the surface of the filter 62 and moves the particles entrained thereon to the discharge chute 68 for collection outside of the fryer 10.

The operation of the fryer 10 involves the steps of supplying to the cooking container or vat 17 a volume of cooking oil to cover the heat transfer tubes 29 and to extend to a level 39 to cover the product conveyor 21 which may be of conventional arrangement. The burner 14, fired with conventional fossil fuels which may be gaseous, liquid or solid fuels such as coal or wood and wood chips, is ignited so as to raise the temperature within the combustion chamber 13 as well as to generate therein a positive pressure to encourage flow of the hot atmosphere through the conducting tubes 29 towards the stack 31. While a burner 41 has been shown in a preferred form of the invention it is also feasible to use electrically heated elements arranged within the chamber 13 and used with a fan or centrifugal blower for supplying the positive pressure to the atmosphere desired to encourage flow of the atmosphere through the conducting tubes. The motor driving the wiper conveyor 24 is set into operation so that the lower run 41 will move the wiper elements 51 towards the sump 26 and the upper run 42 will move the wiper elements over the conducting tubes 29. The in-feed conveyor 22 and product conveyor 21 are both operated for carrying product through the fryer 10. Means in the stack 31 to control the draft from the third manifold 38 is adjusted to provide optimum flow of gases through the manifold sections so that the hot atmosphere will flow from the combustion chamber 13 through the two first manifolds 32 through the first set of conducting tubes 36 into the second manifold 34. The hot atmosphere then flows through the second set 37 of the conducting tubes through to the third manifold 38 and thence to the stack 31. Throughout the passage of the hot gas heat is released to the cooking oil, thereby achieving substantial efficiency in use of any fuels or electrical energy, as the case may be with the burner means supplied.

The fines carried into the sump are treated as described above being swept along with the oil flow toward the stationary screen which is swept by the flight 67 for continuous cleaning with the fines being deposited outside of the cooker 10.

Figure 8:
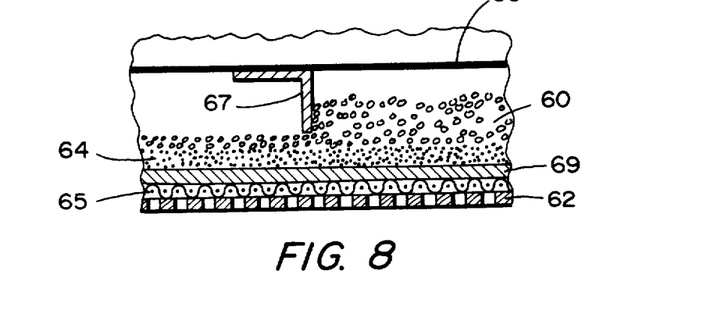
FIG. 8 is an elongated fragmentation view as indicated by the arrows 8 of FIG. 7.
Figure 9:
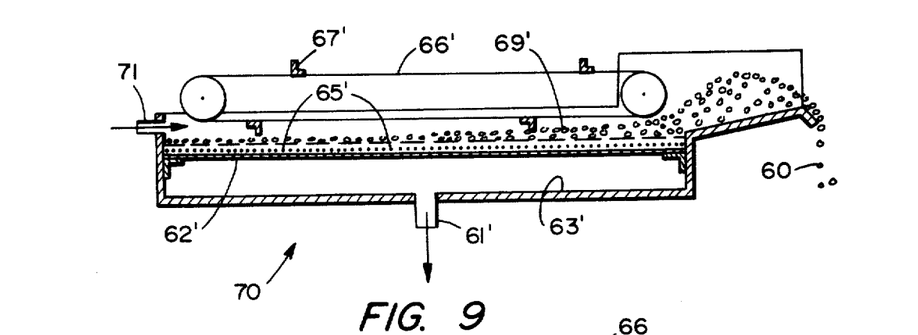
FIG. 9 is a view of another form of the filter system useful with the present invention.

There is shown in FIG. 9 of the drawings a filter system 70 which achieves the function of the filter system 27 described above and shown in FIGS. 7 and 8 and thus where the components are similar to those shown in FIGS. 7 and 8 those shown in FIG. 9 are indicated with "prime" numbers. The filter system 70 may be located remotely from a body of liquid material to be filtered, such as the cooking system 10, but coupled to the body of liquid to be filtered through the inlet pipe 71. A suction head is caused through the oil suction outlet 61' which is coupled to a positive displacement suction pump (not shown). The effect of the pump is to maintain an oil flow in the direction of the arrows as shown in FIG. 9 through the plenum 63'. Thus, oil entering through the outlet 71 is spread across the stationary filter portion 62' which may comprise a fines filter screen 65' or a layer of diatomaceous earth 64' or filter paper 69'. The continuously movable flighted conveyor 66' serves to sweep the food particles or the like 60 along the surface of the filter bed to discharge as shown. The flight 67' is spaced above the bed, for example 1/16 of an inch, in the configuration as shown in FIGS. 8 and 9, and thus the filter media comprises not only the above mentioned elements but also a bed of filtered food particles and the like. One distinct advantage of the filter system 70 is that it may be coupled to an existing fryer without substantial modifications to the unit and system.

The filter member 62 and 62' supply the mechanical strength to support the filter elements 64', 65', and 69' against the suction head of oil passing through the filter. The support is sufficient to permit a build-up of a cake of entrained, filtered-out material and to permit that material to be removed by shearing off with the flights or blades.

The system 70 may be used in connection with the water removal system disclosed in U.S. Pat. No. 4,251,895.

It will be apparent from the above that there has been disclosed an improved direct fired fryer system which may be constructed in different sizes to realize different capacity of food treatment while yet retaining high efficiency in use of fuel. The heat transfer area substantially increased through heating of the bottom and side walls of the cooking vat from the combustion chamber and by conducting the heating gases through conduction tubes immersed in the cooking oil. A combustion chamber provided as shown in the drawings gives ample volume for full combustion of the fuel enhancing the efficiency of the unit. Further, the presence of conducting tubes within the vat materially reduces the volume of cooking oil required and the presence of the wiper system materially reduces the contamination of the cooking oil by particles of product which fall through the product conveyor belt 21. The invention as described above is defined by the claims which follow.

What is claimed is:

1. An improved, direct fired fryer for cooking foodstuffs, comprising a frame, means on said frame defining a combustion chamber, burner means serving to heat the atmosphere within said combustion chamber, means providing a cooking vat on said frame serving to hold a supply of cooking oil or the like and including a generally planar bottom wall serving as a heat transmitting member between said combustion chamber and the cooking oil within said vat, first, second and third manifold means on said frame, said first manifold means being in communication with said combustion chamber, said first and second manifold means including a first set of heat conducting tubes extending therebetween, said second and third manifold means including a second set of heat conducting tubes extending therebetween, said sets of heat conducting tubes serving to transfer heat from the combustion chamber to the cooking oil and being disposed in said cooking vat below the nominal oil liquid level therein and above said bottom wall, means on said fryer providing an exhaust stack in communication with said third manifold means, said combustion chamber, manifold means, conducting tubes and exhaust stack communicating in a circuit so that the heated atmosphere from said combustion chamber traverses sequentially said first manifold means and first set of heat conducting tubes, said second manifold means and said second set of heat conducting tubes and thence through said third manifold means and the exhaust stack.

2. The fryer of claim 1 and further including conveyor means serving to carry a product with respect to said cooking container, said conveyor being arranged with at least one run thereof disposed below the nominal oil liquid level and above said heat conducting tube means.

3. The fryer of claim 2 wherein said product carrying conveyor means includes infeed conveyor means and outfeed conveyor means serving respectively to carry product into and out of said cooking container.

4. The fryer of claim 1 wherein means defining a sump are provided arranged below the general plane of said bottom wall, wiper means arranged in said cooking vat and including a conveyor having a lower run serving to sweep fines along said bottom wall toward said sump means, and a top run of said conveyor serving to wipe the upper surfaces of said heat conducting tubes, thereby to reduce burn-on of carbonaceous materials on said bottom wall and conducting tubes.

5. The fryer of claim 4 wherein said sump means is equipped with filter means, said filter means including a stationary filter member and movable wiper means arranged above said stationary member to permit a filter media bed to be generated upon such stationary filter member.

6. A direct fired fryer for cooking foodstuffs, comprising a frame, means on said frame defining a combustion chamber, burner means serving to heat the atmosphere within said combustion chamber, means providing a cooking vat on said frame and including end, bottom and side walls serving to hold a supply of cooking oil therein, said combustion chamber and cooking vat being arranged such that the side walls of said cooking vat are spaced from the confronting side walls of said combustion chamber thereby providing a space therebetween, and manifold means along the side walls of said cooking vat, one portion of said manifold means being in communication with said combustion chamber and another portion of said manifold means being adapted for communication with an exhaust stack, and heat conducting tube means disposed in communication with said manifold means and being arranged in said cooking vat above the bottom wall thereof and disposed below the nominal cooking oil level, said manifold means and said conducting tube means communicating in a circuit so that the heated atmosphere from said combustion chamber transverses said manifold and conducting tube means en route to the exhaust stack.

7. The fryer of claim 6 wherein said cooking vat is equipped with a sump disposed below the general plane of the bottom wall of said vat, wiper means arranged in said cooking vat and including a conveyor having a lower run serving to sweep fines along said bottom wall towards said sump, and a top run of said conveyor serving to wipe the upper surface of said heat conducting tube means.

8. The fryer of claim 7 wherein said sump is equipped with filter means, said filter means including a stationary filter member and a movable wiper blade means arranged above said stationary member serving to shear material accumulated upon the stationary filter member, and discharge means arranged on said sump for receiving the sheared, filtered material.

9. The fryer of claim 7 wherein said combustion chamber means is substantially coextensive with said cooking vat, and wherein said sets of heat conducting tubes extend transversely to the path of said wiper means.

* * * * *